US010210269B1

(12) United States Patent
Kenthapadi et al.

(10) Patent No.: US 10,210,269 B1
(45) Date of Patent: *Feb. 19, 2019

(54) COMPUTATION OF SIMILAR LOCATIONS BASED ON POSITION TRANSITION DATA IN A SOCIAL NETWORKING SERVICE

(71) Applicant: Microsoft Technology Licensing, LLC, Redmond, WA (US)

(72) Inventors: Krishnaram Kenthapadi, Sunnyvale, CA (US); Stuart MacDonald Ambler, Longmont, CO (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 194 days.

This patent is subject to a terminal disclaimer.

(21) Appl. No.: 15/338,795

(22) Filed: Oct. 31, 2016

(51) Int. Cl.
*G06F 17/30* (2006.01)

(52) U.S. Cl.
CPC .. *G06F 17/30867* (2013.01); *G06F 17/30958* (2013.01)

(58) Field of Classification Search
CPC ........ G06F 17/30867; G06F 17/30958; G06Q 30/0251
USPC ................. 707/730, 754; 705/7.14
See application file for complete search history.

(56) References Cited

U.S. PATENT DOCUMENTS

| 6,189,005 | B1 * | 2/2001 | Chakrabarti | G06F 17/30551 707/730 |
| 2007/0282618 | A1 * | 12/2007 | Barahona | G06Q 10/04 705/338 |
| 2011/0231365 | A1 * | 9/2011 | Bahl | G06F 8/34 707/626 |
| 2014/0067535 | A1 * | 3/2014 | Rezaei | G06F 17/30598 705/14.54 |

* cited by examiner

*Primary Examiner* — Shahid A Alam
(74) *Attorney, Agent, or Firm* — Schwegman Lundberg & Woessner, P.A.

(57) ABSTRACT

In an example, a granularity of location similarity is determined, wherein the granularity of location similarity is a level at which social networking data should be filtered to identify locations similar to a target location. Then a weighted graph of locations at the granularity of location similarity is constructed, wherein each node in the weighted graph is a location and a directed edge exists in the weighted graph between a first node and a second node if the social networking data, at the granularity of location similarity, indicates that a transition occurred wherein a member who resided at a location corresponding to the first node transitioned to reside to a location corresponding to the second node. The weighted graph of locations is traversed from a node corresponding to the target location in order to identify locations similar to the target location.

18 Claims, 16 Drawing Sheets

COMPUTATION OF SIMILAR LOCATIONS BASED ON POSITION TRANSITION DATA IN A SOCIAL NETWORKING SERVICE

TECHNICAL FIELD

The present disclosure generally relates to computer technology for solving technical challenges in providing statistical insights based on confidential data submitted in a computer system. More specifically, the present disclosure relates to computation of similar locations based on position transition data in a social networking service.

BACKGROUND

In various types of computer systems, there may be a need to collect, maintain, and utilize confidential data. In some instances, users may be reluctant to share this confidential information over privacy concerns. These concerns extend not only to pure security concerns, such as concerns over whether third parties such as hackers may gain access to the confidential data, but also to how the computer system itself may utilize the confidential data. With certain types of data, users providing the data may be somewhat comfortable with uses of the data that maintain anonymity, such as the confidential data merely being used to provide broad statistical analysis to other users.

One example of such confidential data is salary/compensation information. It may be desirable for a service such as a social networking service to entice its members to provide information about their salary or other work-related compensation in order to provide members with insights into various metrics regarding salary/compensation, such as an average salary for a particular job type in a particular city. There are technical challenges encountered, however, in providing various metrics to members. One particular technical challenge is that it can be difficult to determine locations that are similar to ones that the member already resides in (or is already interested in). Common metrics for similarity between cities, such as population size, weather, etc., may or may not have relevance for job searching. Additionally, locations may be considered similar for some industries but not others. For example, Silicon Valley and Austin both have fairly large software technology presences, but San Diego does not. Despite the fact that San Diego may have a similar population as Silicon Valley and similar weather, for the software industry Austin is actually a closer match to Silicon Valley than San Diego is.

Similar technical issues arise with titles and peer company groups.

BRIEF DESCRIPTION OF THE DRAWINGS

Some embodiments of the technology are illustrated, by way of example and not limitation, in the figures of the accompanying drawings.

DETAILED DESCRIPTION

The present disclosure describes, among other things, methods, systems, and computer program products. In the following description, for purposes of explanation, numerous specific details are set forth in order to provide a thorough understanding of the various aspects of different embodiments of the present disclosure. It will be evident, however, to one skilled in the art, that the present disclosure may be practiced without all of the specific details.

In an example embodiment, an architecture is provided that gathers confidential information from users, tracks the submission of the confidential information, and maintains and utilizes the confidential information in a secure manner while ensuring that the confidential information is accurate and reliable.

Figure 1:
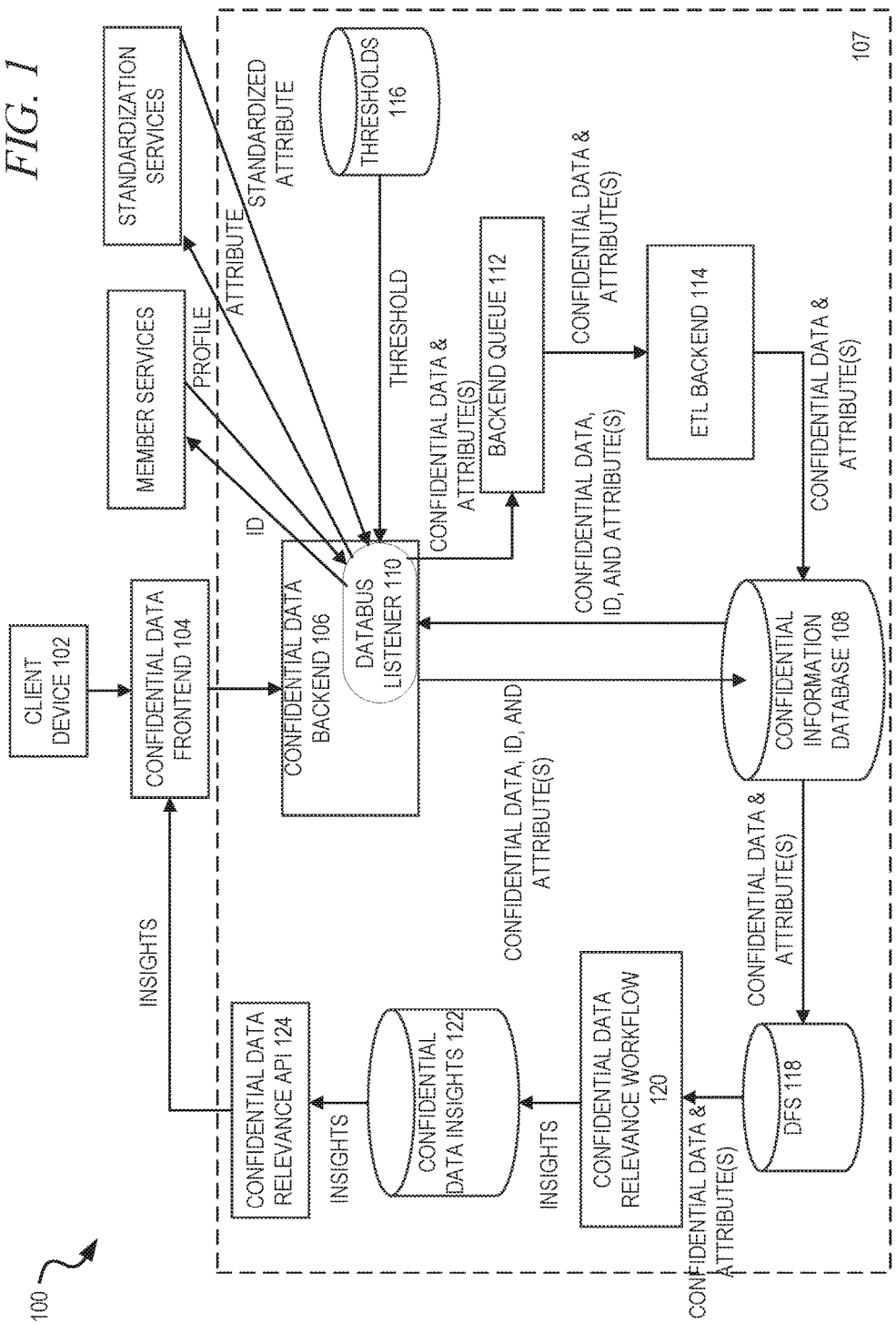
FIG. 1 is a block diagram illustrating a confidential data collection, tracking, and usage system, in accordance with an example embodiment.

FIG. 1 is a block diagram illustrating a confidential data collection, tracking, and usage system 100, in accordance with an example embodiment. A client device 102 may utilize a confidential data frontend 104 to submit confidential information to a confidential data backend 106. In some example embodiments, the confidential data backend 106 is located on a server-side or cloud platform 107 while the confidential data frontend 104 is directly connected to or embedded in the client device 102. However, in some example embodiments, the confidential data frontend 104 is also located on the server-side or cloud platform 107.

There may be various different potential implementations of the confidential data frontend 104, depending upon the type and configuration of the client device 102. In an example embodiment, the confidential data frontend 104 may be a web page that is served to a web browser operating on the client device 102. The web page may include various scripts, such as JavaScript code, in addition to Hypertext Markup Language (HTML) and Cascading Style Sheets (CSS) code designed to perform various tasks that will be described in more detail below. The web page may be served in response to the user selecting a link in a previous communication or web page. For example, the link may be displayed in an email communication to the user, or as part of a feed section of the user's social networking service member page. This allows the entity operating the confidential data collection, tracking, and usage system 100 to selectively target users to request that they submit confidential information. For example, the entity may determine that there is a need to obtain more salary information for users from Kansas and then may send out communications to, or cause the social networking service to alter feeds of, users in a manner that allows the users to select the link to launch the confidential data frontend 104.

In another example embodiment, the confidential data frontend 104 may be built into an application installed on the client device 102, such as a standalone application running on a smartphone. Again this confidential data frontend 104 is designed to perform various tasks that will be described in more detail below.

One task that the confidential data frontend 104 may be designed to perform is the gathering of confidential data from a user of the client device 102. Another task that the confidential data frontend 104 may be designed to perform is to display insights from confidential data contributed by other users. In order to incentivize users to provide certain types of confidential data, in an example embodiment, insights from the confidential data contributed by other users are provided in response to the user contributing his or her own confidential data. As will be described in more detail, a mechanism to ensure that the contribution of confidential data is tracked is provided.

Once the confidential data is received from the user, the confidential data frontend 104 may transmit the confidential data along with an identification of the user (such as a member identification reflecting the user's account with a social networking service) to the confidential data backend 106. In an example embodiment, this may be performed via, for example, a REST Application Program Interface (API).

The confidential data, along with the identification of the user, may be stored in a submission table by the confidential data backend 106 in a confidential information database 108. In some example embodiments, this submission table may be encrypted in order to ensure security of the information in the submission table. Furthermore, in some example embodiments, the confidential data stored in the submission table may be encrypted using a different key than the identifying information in the submission table. This encryption will be described in more detail below.

In another example embodiment, a random transaction number is generated for each confidential data submission. This random transaction number is stored with the identifying information in one table, and then stored with the confidential data in another table, with each table encrypted separately using a different key. In either this example embodiment or the previous example embodiment, encrypting the identifying information separately from the confidential data (either in one table or in separate tables) provides added security against the possibility that a malicious user could gain access to one or the other. In other words, even if a malicious user gained access to the identifying information by, for example, hacking the encryption used to encrypt the identifying information, that would not allow the malicious user to gain access to the confidential data corresponding to the identifying information, and vice versa. In an example embodiment, the encryption mechanism used is one that is non-deterministic, such that the same information encrypted twice would produce different results in each encryption. In another example embodiment, the transaction number itself is also encrypted, thereby preventing even the act of joining separate tables containing the identifying information and the confidential data.

In an example embodiment, a submission table may also be able to track when submissions were made by users. As such, the submission table may include additional columns such as, for example, a submission identification, an identification of the user who made the submission, an encryption key for the submission, and timestamp information about when the submission was made. The submission table may then be utilized by the confidential data backend 106 to determine, for example, when to share insights from submissions from other users to a particular user. If, for example, the user has previously submitted confidential data and has done so recently (e.g., within the last year), then the confidential data backend 106 may indicate to the confidential data frontend 104 that it should share insights from confidential data from other users with this particular user.

There may be other methods than those described above for determining eligibility of a user for receiving insights from submissions from other users. For example, a predicate expressed in terms of one or more attributes may need to be satisfied in order to receive the insights, such as particular demographic or profile-based attributes. These attributes can include any such attribute, from location, to title, to level of skill, to social networking service activities or status (e.g., about to transition from being an active member to an inactive member), to transactional attributes (e.g., purchased a premium subscription).

Additionally, any combination of the above factors can be used to determine whether the user is eligible for receiving insights from submissions from other users.

Furthermore, the submission table may also include one or more attributes of the user that made the submission. These attributes may be attributes that can be useful in determining a slice to which the user belongs. Slices will be described in more detail below, but generally involve a segment of users sharing common attributes, such as titles, locations, educational levels, and the like. It should be noted that it is not necessary for these attributes to be stored in the submission table. Since an identification of the user is available in the submission table, it may be possible to retrieve the attributes for the user on an as-needed basis, such as by querying a social networking service with the user identification when needed.

A databus listener 110 detects when new confidential data is added to the confidential information database 108 and triggers a workflow to handle the new confidential data. First, the databus listener 110 queries a thresholds data store 116 to determine if one or more thresholds for anonymization have been met. Specifically, until a certain number of data points for confidential data have been met, the confidential data collection, tracking, and usage system 100 will not act upon any particular confidential data point. As will be described in more detail later, these thresholds may be created on a per-slice basis. Each slice may define a segment of users about which insights may be gathered based on data points from confidential data submitted by users in the slice. For example, one slice may be users with the title "software engineer" located in the "San Francisco Bay Area." If, for example, the confidential data is compensation information, then it may be determined that in order to gain useful insights into the compensation information for a particular title in a particular region, at least ten data points (e.g., compensation information of ten different users) are needed. In this case, the threshold for "software engineer" located in "San Francisco Bay Area" may be set at ten. The databus listener 110, therefore, is designed to retrieve the confidential data added to the confidential information database 108, retrieve the threshold for the slice corresponding to attributes of the user (as stored, for example, in the submission table in the confidential information database 108 or retrieved at runtime from a social networking service), determine if the new data point(s) cause the threshold for the corresponding slice to be exceeded, and, if so, or if the threshold has already been exceeded, insert the data in a backend queue 112 for extract, transform, and load (ETL) functions.

In an example embodiment, the thresholds data store 116 contains not just the thresholds themselves but also a running count of how many data points have been received for each slice. In other words, the thresholds data store 116 indicates how close the slice is to having enough data points with which to provide insights. The databus listener 110 may reference these counts when making its determination that a newly submitted data point causes a threshold to be exceeded. Running counts of data points received for each slice are updated in the thresholds data store 116 by the confidential data backend 106.

Since the databus listener 110 only transfers data points for a particular slice to the backend queue 112 once the threshold for that slice has been exceeded, the confidential data points corresponding to that slice may need to be retrieved from the confidential information database 108 once the threshold is determined to be exceeded. For example, if, as above, the threshold for a particular slice is ten data points, the first nine data points received for that slice may simply be left in the confidential information database 108 and not sent to the backend queue 112. Then, when the tenth data point for the slice is stored in the confidential information database 108, the databus listener 110 may determine that the threshold has been exceeded and retrieve all ten data points for the slice from the confidential information database 108 and send them to the backend queue 112 for processing.

It should be noted that the information obtained by the databus listener 110 from the confidential information database 108 and placed in the backend queue 112 is anonymized. In an example embodiment, no identification of the users who submitted the confidential data is provided to the backend queue 112. Indeed, in some example embodiments, the information provided to the backend queue 112 may simply be the confidential data itself and any information needed in order to properly group the confidential data in one or more slices. For example, if slices are designed to group user confidential data based only on user title, location, and years of experience, other attributes for the user that might have been stored in the confidential information database 108, such as schools attended, may not be transferred to the backend queue 112 when the confidential data tied to those attributes is transferred to the backend queue 112. This further helps to anonymize the data, as it makes it more difficult for people to be able to deduce the identity of a user based on his or her attributes.

It should also be noted that any one piece of confidential data may correspond to multiple different slices, and thus the databus listener 110 may, in some example embodiments, provide the same confidential data to the backend queue 112 multiple times. This can occur at different times as well, because each of the slices may have its own threshold that may be transgressed at different times based on different counts. Thus, for example, compensation data for a user in the "San Francisco Bay Area" with a job title of "software developer" and a school attended as "Stanford University" may be appropriately assigned to one slice of software developers in the San Francisco Bay Area, a slice of Stanford University alums, and a slice of software developers in the United States. All slices may have their own thresholds and counts from confidential data from other users, who may or may not have complete overlap with these three slices.

An ETL backend 114 acts to extract, transform, and load the confidential data to anonymize and group it and place it back in the confidential information database 108 in a different location from that where it was stored in non-anonymized form. It should be noted that in some example embodiments, the anonymization described above with respect to the databus listener 110 may actually be performed by the ETL backend 114. For example, the databus listener 110 may send non-anonymized confidential data along with all attributes to the backend queue 112, and it may be the ETL backend 114 that reviews this data and discards certain elements of it to anonymize it.

In an example embodiment, the confidential information is stored in encrypted format in the confidential information database 108 when the databus listener 110 sends it to the backend queue 112. As such, one function of the ETL backend 114 is to decrypt the confidential information. Encryption and decryption of the confidential data will be discussed in more detail below.

The ETL backend 114 writes the anonymized confidential data and slice information into an ETL table corresponding to the slice in the confidential information database 108. As described earlier, this ETL table may be stored in a different location than that in which the confidential data was stored initially, such as the submission table described earlier.

At a later time, and perhaps using a batch or other periodic process, the information from the ETL table may be loaded in a distributed file system (DFS) 118. A confidential data relevance workflow 120 may then extract relevant information from the DFS 118 and provide one or more insights into the relevant information in a confidential data insights data store 122. A confidential data relevance API 124 may then be utilized to provide insights from the confidential data insights data store 122 to the confidential data frontend 104, which can then display them to a user. As described earlier, these insights may be provided only on a "give-to-get" basis, namely that only users who provide confidential information (and/or have provided it recently) can view insights.

Figure 2A:
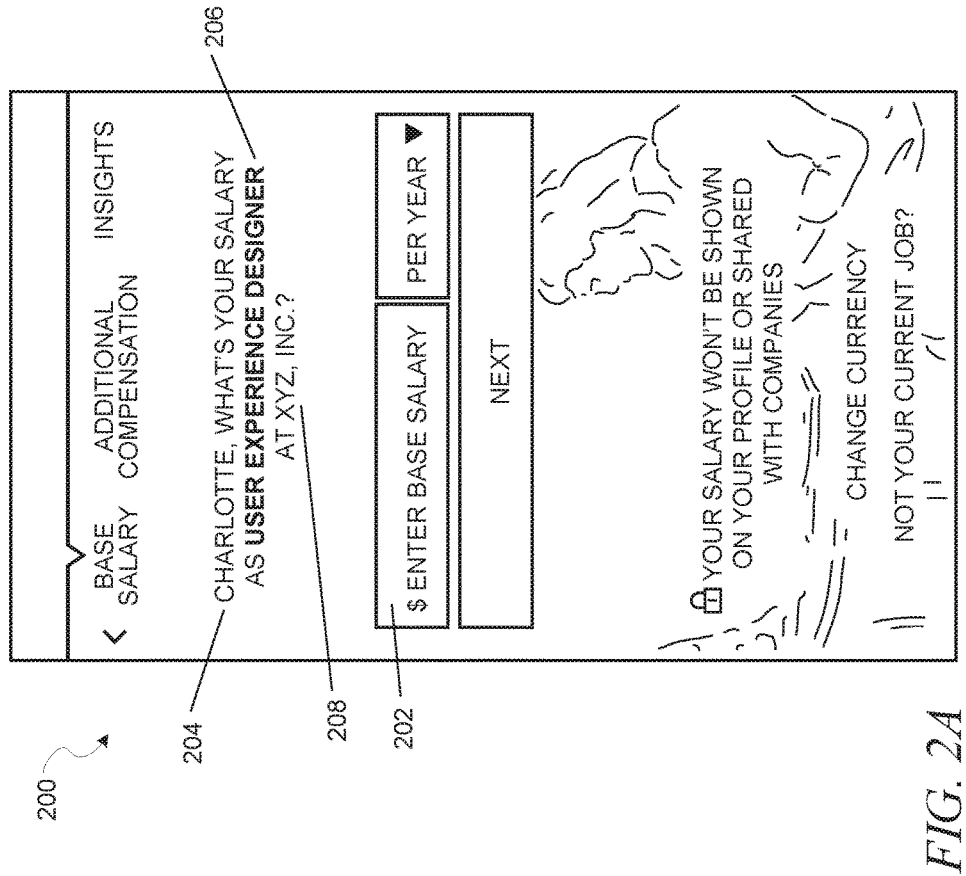
FIGS. 2A-2C are screen captures illustrating an example of a user interface provided by a confidential data frontend, in accordance with an example embodiment.
Figure 2B:
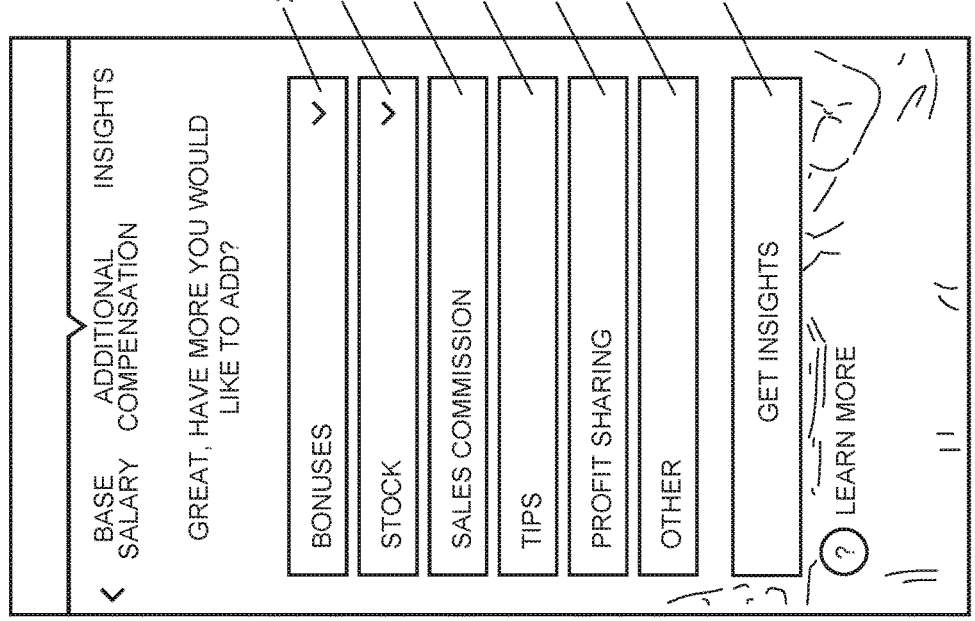
Figure 2C:
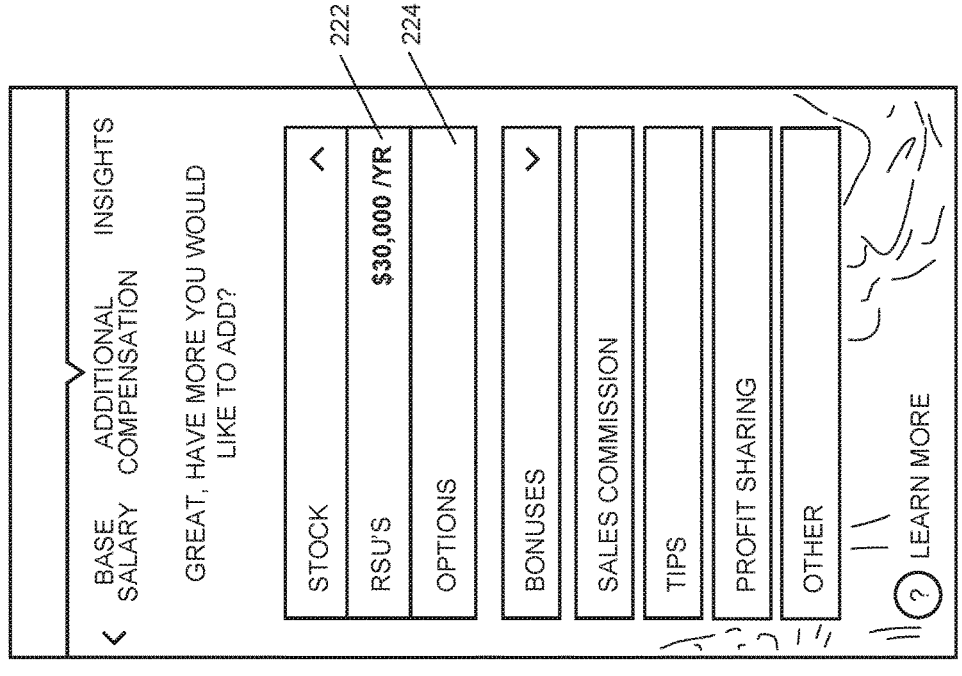

Turning now to more detail about the submission process, FIGS. 2A-2C are screen captures illustrating an example of a user interface 200 provided by the confidential data frontend 104, in accordance with an example embodiment. Referring first to FIG. 2A, the user interface 200 here is depicted as a screen of a standalone application operating on a mobile device, such as a smartphone. In FIG. 2A, the user is prompted to enter a base salary in a text box 202, with a drop-down menu providing options for different time periods on which to measure the base salary (e.g., per year, per month, per hour, etc.). Additionally, the user may be identified by name at 204, the user's title may be identified at 206, and the user's current employer may be identified at 208. This information may be prepopulated into the user interface 200, such as by retrieving this information from a member profile for the user in a social networking service. This eliminates the need for the user to enter this information manually, which can have the effect of dissuading some users from providing the confidential information or completing the submission process, especially on a mobile device where typing or otherwise entering information may be cumbersome.

Turning to FIG. 2B, here the user interface 200 displays a number of other possible compensation types 210-220 from which the user can select. Selecting one of these other possible compensation types 210-220 causes the user interface 200 to provide an additional screen where the user can submit confidential data regarding the selected compensation type 210-220. Here, for example, the user has selected "Stock" 212. Referring now to FIG. 2C, the user interface 200 then switches to this screen, which allows the user to provide various specific details about stock compensation, such as restricted stock unit (RSU) compensation 222 and options 224. The user interface 200 at this stage may also display the other compensation types 210-220 that the user can make additional submissions for.

Referring back to FIG. 2B, when the user has completed entering all the confidential data, such as all the different compensation types appropriate for his or her current job, a "Get insights" button 226 may be selected, which launches a process by which the confidential data backend 106 determines whether the user is eligible to receive insights from confidential data from other users and, if so, indicates to the confidential data backend 106 that the insights should be provided. Additionally, selection of the "Get insights" button 226 represents an indication that the submission of the confidential data by this user has been completed, causing the confidential data backend 106 to store the confidential data in the confidential information database 108 as described below, which then may trigger the databus listener 110 to extract the confidential information and cause the ETL backend 114 to anonymize the confidential data and place it in the appropriate ETL tables corresponding to the appropriate slices in which the confidential data belongs. This permits the submitted confidential data to be available for future insights.

Figure 3:
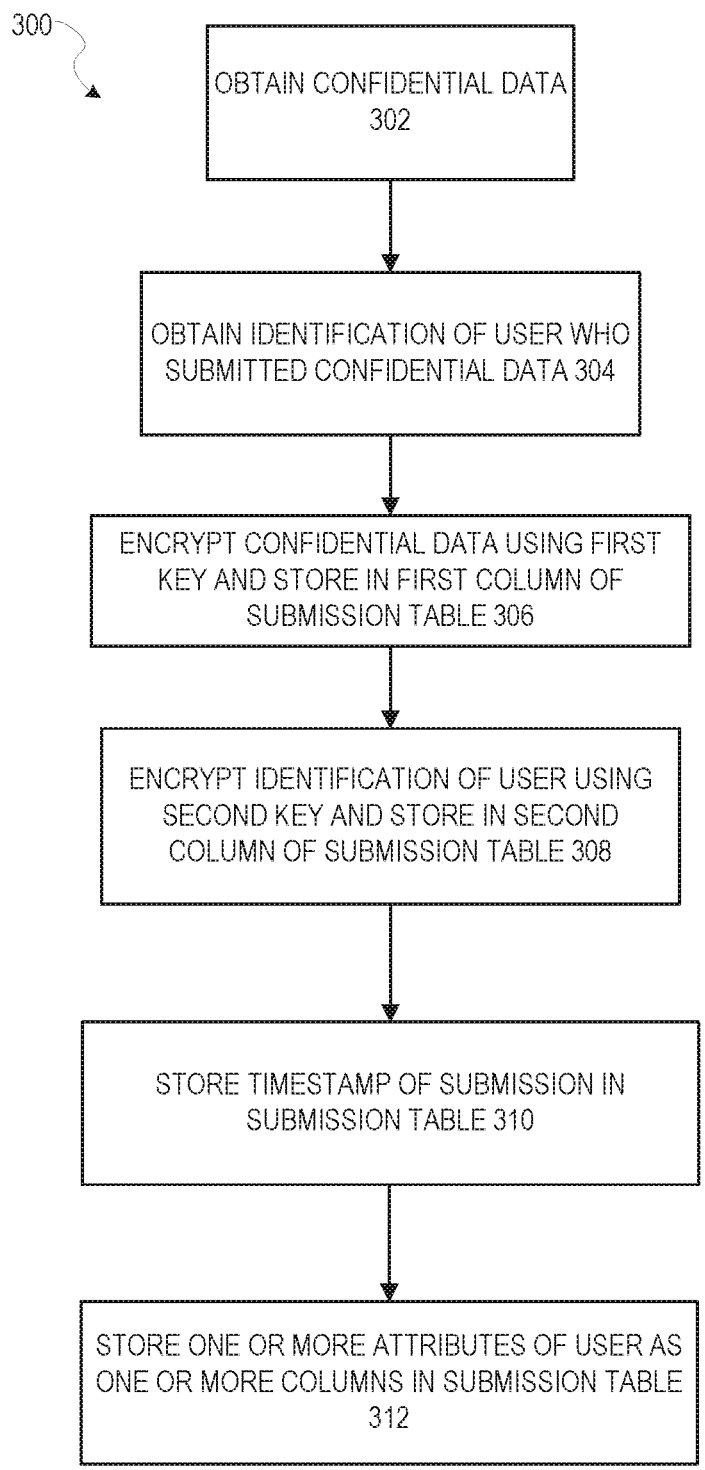
FIG. 3 is a flow diagram illustrating a method for confidential data collection and storage, in accordance with an example embodiment.

FIG. 3 is a flow diagram illustrating a method 300 for confidential data collection and storage, in accordance with an example embodiment. In an example embodiment, the method 300 may be performed by the confidential data backend 106 of FIG. 1. At operation 302, confidential data is obtained. At operation 304, an identification of the user who submitted the confidential data is obtained. It should be noted that while operations 302 and 304 are listed separately, in some example embodiments they may be performed in the same operation. For example, in an example embodiment, the confidential data frontend 104 may, upon receiving an indication from a user that input of confidential data in the confidential data frontend 104 by the user has been completed, forward the inputted confidential data and an identification of the user to the confidential data backend 106. In other example embodiments, however, the operations 302 and 304 may be performed separately. For example, in an example embodiment, the identification of the user may not be obtained directly from the confidential data frontend 104, but rather some other type of identifying information may be obtained directly from the confidential data frontend 104, and this other type of identifying information may be used to query a social networking service or other third-party service for the identification information for the user. Regardless, after operations 302 and 304 have been performed, the confidential data backend 106 has at its disposal some confidential data and identification information for the user who entered the confidential data.

It should be noted that the confidential data may be a single piece of information, or may be multiple related pieces of information. For example, the confidential data may simply include a total compensation value and nothing more, or may include a complete breakdown of different types of compensation (e.g., base salary, bonus, stock, etc.).

Users are understandably concerned about the security of the confidential information, and specifically about a malicious user being able to correlate the confidential information and the identification of the user (i.e., not just learning the confidential information but also tying the confidential information specifically to the user). As such, at operation 306, the confidential data is encrypted using a first key and stored in a first column of a submission table in a confidential information database. Then, at operation 308, the identification of the user who submitted the confidential data is separately encrypted using a second key and stored in a second column of the submission table in the confidential information database.

Additionally, a number of optional pieces of information may, in some example embodiments, be stored in the submission table at this point. At operation 310, a timestamp of the submission of the confidential data may be stored in a column in the submission table. This timestamp may be used in, for example, a determination of whether the user is eligible to receive insights from confidential data submitted by other users. At operation 312, one or more attributes of the user may be stored as one or more columns in the submission table. These attributes may be used, for example, in determining to which slice(s) the confidential data may apply, as will be described in more detail below.

Figure 4:
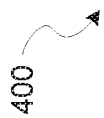
FIG. 4 is a diagram illustrating an example of a submission table, in accordance with an example embodiment.

FIG. 4 is a diagram illustrating an example of a submission table 400, in accordance with an example embodiment. Each row in the submission table 400 corresponds to a different submission. Here, the submission table 400 includes five columns. In a first column 402, confidential data encrypted by a first key is stored. In a second column 404, identification of the user who submitted the corresponding confidential data, encrypted by a second key, is stored. In a third column 406, a timestamp for the submission is stored. In a fourth column 408, a first attribute of the user, here location, is stored. In a fifth column 410, a second attribute of the user, here title, is stored. Of course, there may be additional columns to store additional attributes or other pieces of information related to the submission.

Notably, FIG. 4 depicts an example embodiment where only the first and second columns 402, 404 are encrypted, using different encryption keys. In some example embodiments, the additional columns 406-410 may also be encrypted, either individually or together. In some example embodiments, one or more of these additional columns 406-410 may be encrypted using the same key as the first or second column 402, 404. Furthermore, in some example embodiments, the submission table 400 may be additionally encrypted as a whole, using a third encryption key different from the keys used to encrypt the first and second columns 402, 404.

It should be noted that while FIGS. 3 and 4 describe the confidential data as being stored in a single column in a submission table, in some example embodiments, this column is actually multiple columns, or multiple sub-columns, with each corresponding to a subset of the confidential data. For example, if the confidential data is compensation information, the confidential data may actually comprise multiple different pieces of compensation information, such as base salary, bonus, stock, tips, and the like. Each of these pieces of compensation information may, in some example embodiments, have its own column in the submission table. Nevertheless, the processes described herein with regard to the "column" in which the confidential data is stored apply equally to the embodiments where multiple columns are used (e.g., the individual pieces of compensation information are still encrypted separately from the user identification information).

Figure 5:
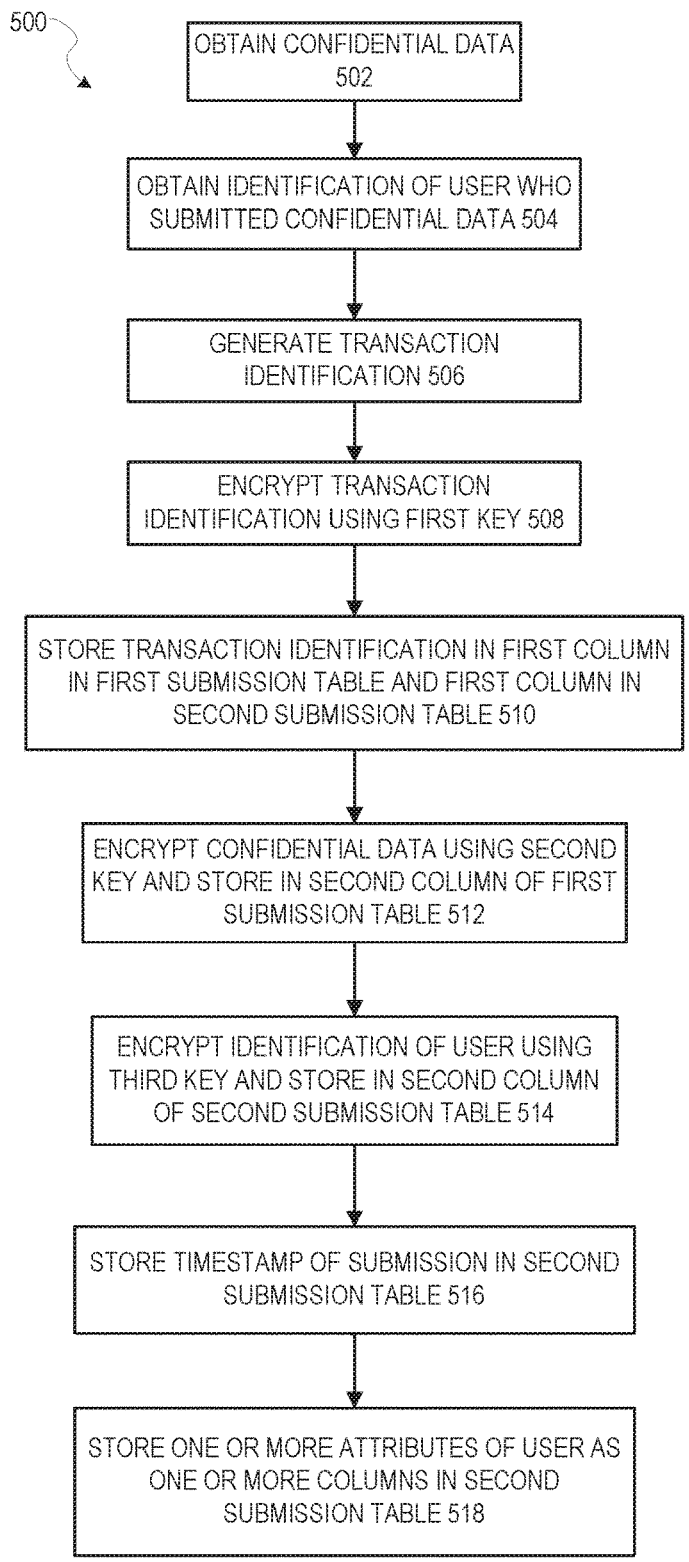
FIG. 5 is a flow diagram illustrating a method for confidential data collection and storage, in accordance with an example embodiment.

FIG. 5 is a flow diagram illustrating a method 500 for confidential data collection and storage, in accordance with an example embodiment. In contrast with FIG. 3, FIG. 5 represents an example embodiment where the confidential data and the identification of the user who submitted the confidential data are stored in separate tables in order to provide additional security. At operation 502, confidential data is obtained. At operation 504, an identification of the user who submitted the confidential data is obtained. As in FIG. 3, while operations 502 and 504 are listed separately, in some example embodiments they may be performed in the same operation.

At operation 506, a transaction identification is generated. This transaction identification may be, for example, a randomly generated number or character sequence that uniquely identifies the submission. At operation 508, the transaction identification may be encrypted using a first key. At operation 510, the transaction information (either encrypted or not, depending upon whether operation 508 was utilized) is stored in a first column in a first submission table and in a first column in a second submission table in a confidential information database.

At operation 512, the confidential data is encrypted using a second key and stored in a second column of the first submission table in the confidential information database. Then, at operation 514, the identification of the user who submitted the confidential data is separately encrypted using a third key and stored in a second column of the second submission table in the confidential information database.

Additionally, as in FIG. 3, a number of optional pieces of information may, in some example embodiments, be stored in the first and/or second submission tables at this point. At operation 516, a timestamp of the submission of the confidential data may be stored in a column in the second submission table. This timestamp may be used in, for example, a determination of whether the user is eligible to receive insights from confidential data submitted by other users. At operation 518, one or more attributes of the user may be stored as one or more columns in the second submission table. These attributes may be used, for example, in determining to which slice(s) the confidential data may apply, as will be described in more detail below. It should be noted that while operations 516 and 518 are described as placing information in the second submission table, in other example embodiments, one or more of these pieces of information may be stored in the first submission table.

If operation 508 is utilized, then the fact that the transaction identification is encrypted and is the only mechanism by which to link the confidential data in the first submission table with the user identification in the second submission table through a join operation provides an additional layer of security.

Figure 6A:
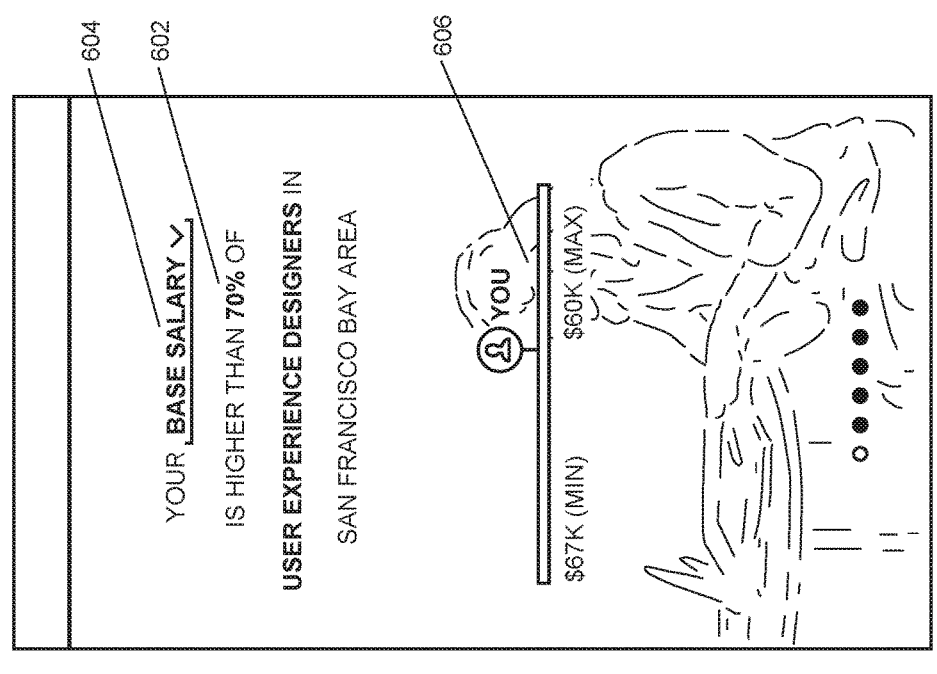
FIGS. 6A-6C are screen captures illustrating a user interface for displaying insights to a first user from confidential data submitted by other users, in accordance with an example embodiment.
Figure 6B:
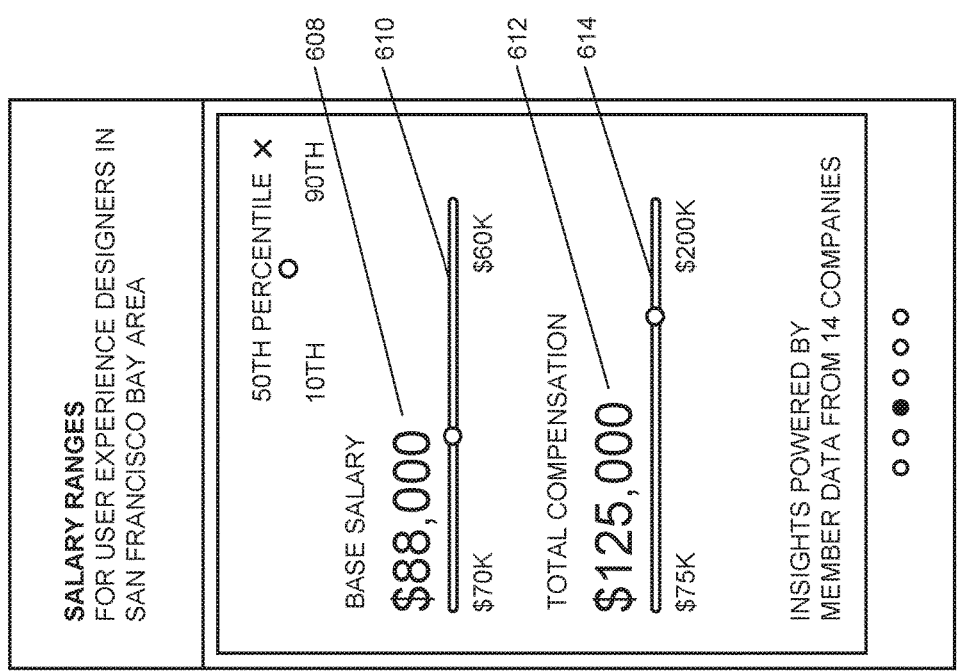
Figure 6C:
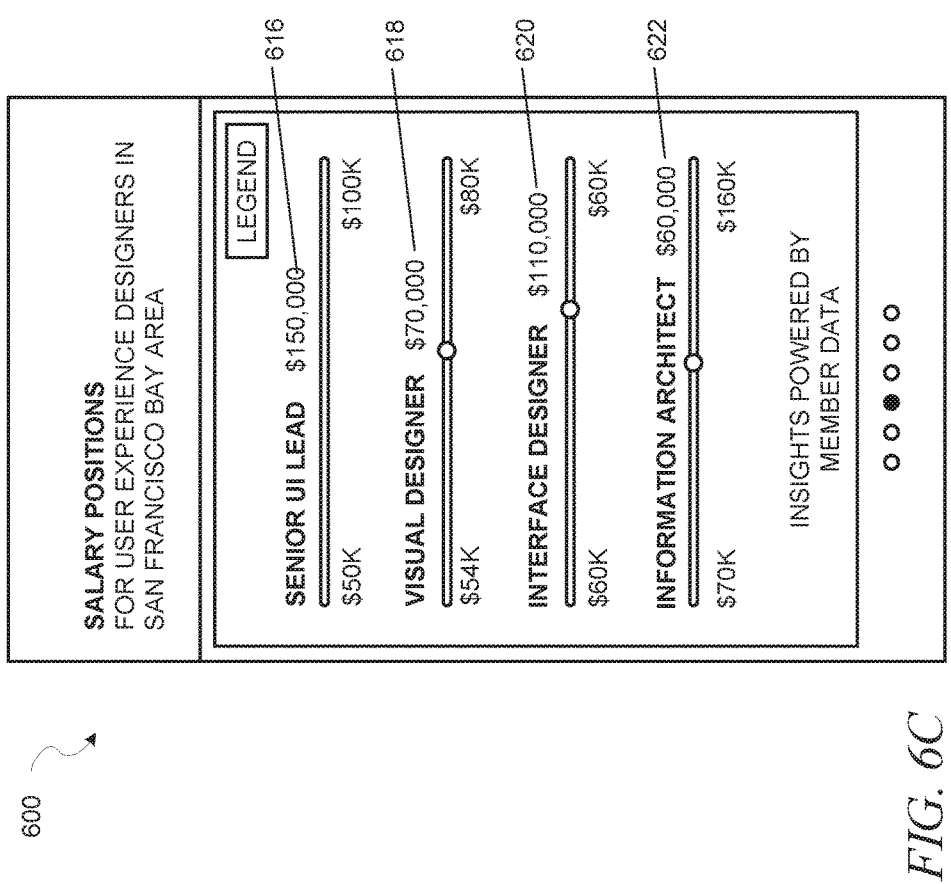

FIGS. 6A-6C are screen captures illustrating a user interface 600 for displaying insights to a first user from confidential data submitted by other users, in accordance with an example embodiment. Referring first to FIG. 6A, the user interface 600 displays a metric 602 comparing confidential data of the first user to confidential data of other users in a same slice as the first user. Here, for example, the first user is able to see that his base salary (as selectable via a drop-down menu 604) is higher than that of 70% of other users in the same slice (the slice being depicted as User Experience Designers in the San Francisco Bay Area). This metric is also displayed as a graphic 606 for easy comparison.

Referring now to FIG. 6B, the user interface 600 displays salary ranges for users in the same slice as the first user, including a median base salary 608, a range of submitted base salaries 610, median total compensation 612, and a range of submitted total compensations 614.

Referring now to FIG. 6C, the user interface 600 displays insights 616, 618, 620, and 622 for positions related to the position of the first user. Notably, these insights 616, 618, 620, and 622 may require using information from slices other than the one the first user belongs to. In an example embodiment, there is no limitation on the confidential data frontend 104 retrieving insights from the confidential data insights data store 122 that come from slices different from ones to which the user being presented with the insights belongs, although in some example embodiments, the confidential data frontend 104 may itself wish to limit the first user's ability to ask for and/or view certain types of information (e.g., the confidential data frontend 104 may permit the first user to view salary information for positions related to the first user's own position, but not unrelated positions).

As depicted above, all of the insights may be statistical information derived from confidential data submitted by users other than the user viewing the insights (as well as potentially including the user's own confidential data as well).

Furthermore, in some example embodiments it may be desirable to display insights based on similar locations to either a member's current location or a specified location. For example, a member could be presented with salary information for cities that are similar to the city that the member currently resides in, or some target city specified by the member.

In order to accomplish this, in an example embodiment, a directed weighted graph of location to location transitions is constructed. Each node in the directed weighted graph represents a location from which one member of the social networking service either transitioned from or to (i.e., relocated). Each edge in the directed weighted graph indicates that a member relocated from a first location (the beginning of the directed weighted graph) to a second location (the end of the directed weighted graph). Weights may be based on one or more of a variety of different factors, such as the number of members that made this particular transition, the fraction of members who made this transition compared to all members who resided in the first location, and a time-decay to give greater weight to more recent transitions. A Laplacian smoothing may then be introduced to address problems that might be caused by a small number of transitions. In an example embodiment, the Laplacian smoothing is dividing the numerator (number of transitions) by the denominator (number of members who resided at first location) plus some constant.

It should be noted that the term "resided in" shall be interpreted broadly to cover any location in which the user spends a significant portion of time. This need not necessarily be the same as the place the user lives. A place of work, for example, could also be considered a place where the user "resides."

The graph itself can be constructed at a number of different levels, including global/industry/function/title granularity. The graph can then be used to obtain the most similar locations for a given location, as a function of the industry/job function/title, etc. In other words, the graph may be constructed at the level at which the similarity determination should be conducted.

Figure 7:
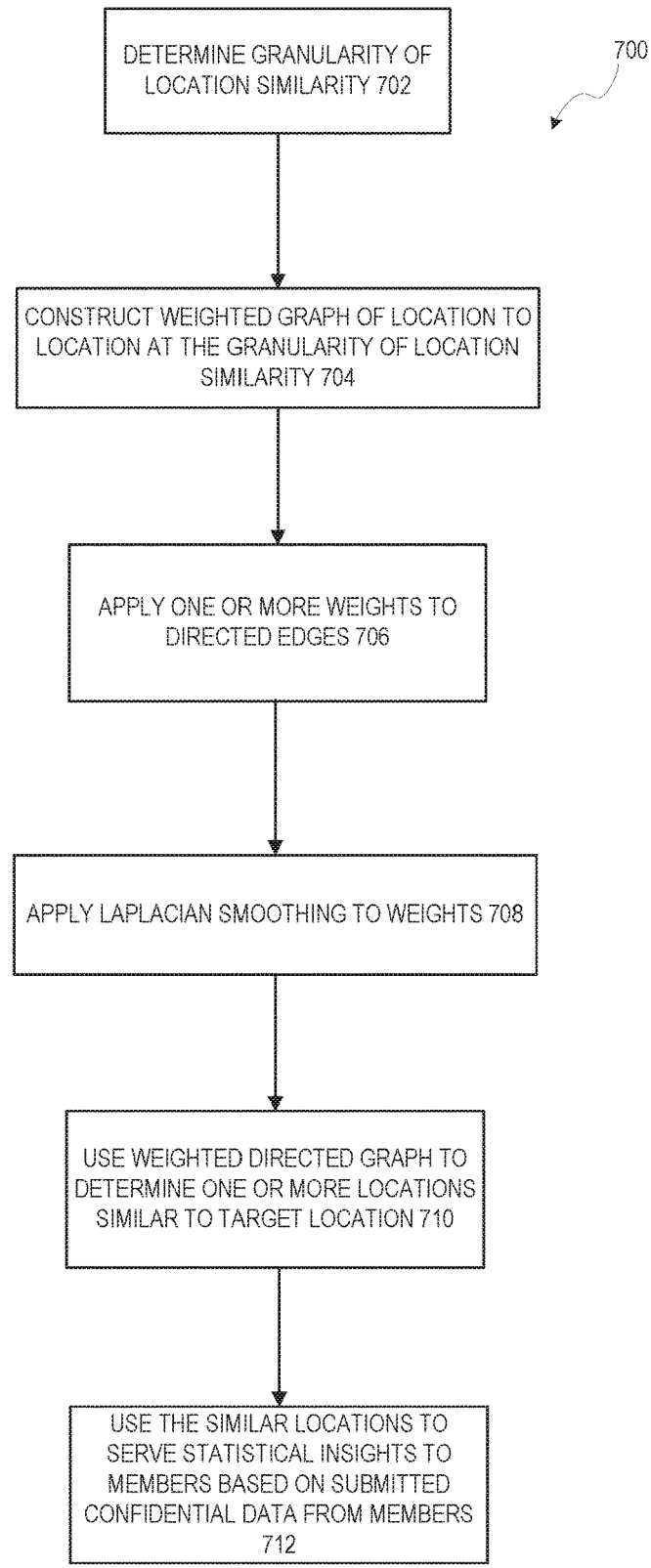
FIG. 7 is a flow diagram illustrating a method of determining similar locations to a first location based on transition information in a social networking service, in accordance with an example embodiment.

FIG. 7 is a flow diagram illustrating a method 700 of determining similar locations to a first location based on transition information in a social networking service, in accordance with an example embodiment. At operation 702, a granularity of location similarity may be determined. The granularity of location similarity may be a set of one or more filters to apply to social networking service data that results in only member data that satisfies the one or more filters being used. At operation 704, a weighted graph of location to location at the granularity of location similarity is constructed, with each node in the graph being a location, and a directed edge occurring from a first node to a second node if a transition occurred in the member data from a location associated with the first node to a location associated with the second node at the granularity of location similarity. At operation 706, one or more weights may be applied to the directed edges. At operation 708, a Laplacian smoothing may be applied to the weights. At operation 710, the weighted directed graph is used to determine one or more locations similar to a target location by finding the node corresponding to the target city and following the edges for any edge having a weight greater than a threshold value to find a similar city at the other end of the edge. At operation 712, the similar locations are used to serve statistical insights to members based on submitted confidential data from the members.

In some example embodiments, a more complex traversal of the weighted directed graph may be utilized. For example, a personalized PageRank algorithm walk may be performed to capture subsequent transition information. For example, if users frequently transitioned from Fresno to San Francisco and then subsequently transitioned to New York, the personalized PageRank algorithm would capture this and indicate a similarity relationship between Fresno and New York, despite few or no direct transitions from Fresno to New York.

Additionally, in some example embodiments, graphs at different granularities may be combined. This may be helpful when data is sparse. For example, if the granularity of the graph is at the title level, the data may be quite sparse for many titles. A graceful fallback approach may be utilized, where the selected level of granularity is attempted and tested, and if data is deemed to be too sparse, a next higher level of granularity is attempted and tested, and so on and so forth until, if necessary, the highest level of granularity (global) is utilized. In a related alternative embodiment, if transitions for particular titles are not sparse, then the data for those titles may be maintained at the title level while other titles are generalized to the next higher level. In other words, the lowest level of granularity that produces results for individual entities may be selected on an entity-by-entity basis.

In another example embodiment, a weighted combination approach may be utilized, wherein graphs at different granularity levels are weighted differently and combined based on the weights.

In another example embodiment, a similar technique is used to compute similar titles based on position transition data. Rather than a directed graph where the nodes correspond to location, here the nodes correspond to titles. The edges of the directed graph represent transitions from positions having one title to positions having another title. Weights may be based on one or more of a variety of different factors, such as the number of members that made this particular transition, the fraction of members who made this transition compared to all members who held a position with the first title, and a time-decay to give greater weight to more recent transitions. A Laplacian smoothing may then be introduced to address problems that might be caused by a small number of transitions. In an example embodiment, the Laplacian smoothing is dividing the numerator (number of transitions) by the denominator (number of members who held a position with the first title) plus some constant.

The graph itself can be constructed at a number of different levels, including global/industry/function/title granularity. The graph can then be used to obtain the most similar titles for a given title, as a function of the industry/job function/title, etc. In other words, the graph may be constructed at the level at which the similarity determination should be conducted.

Figure 8:
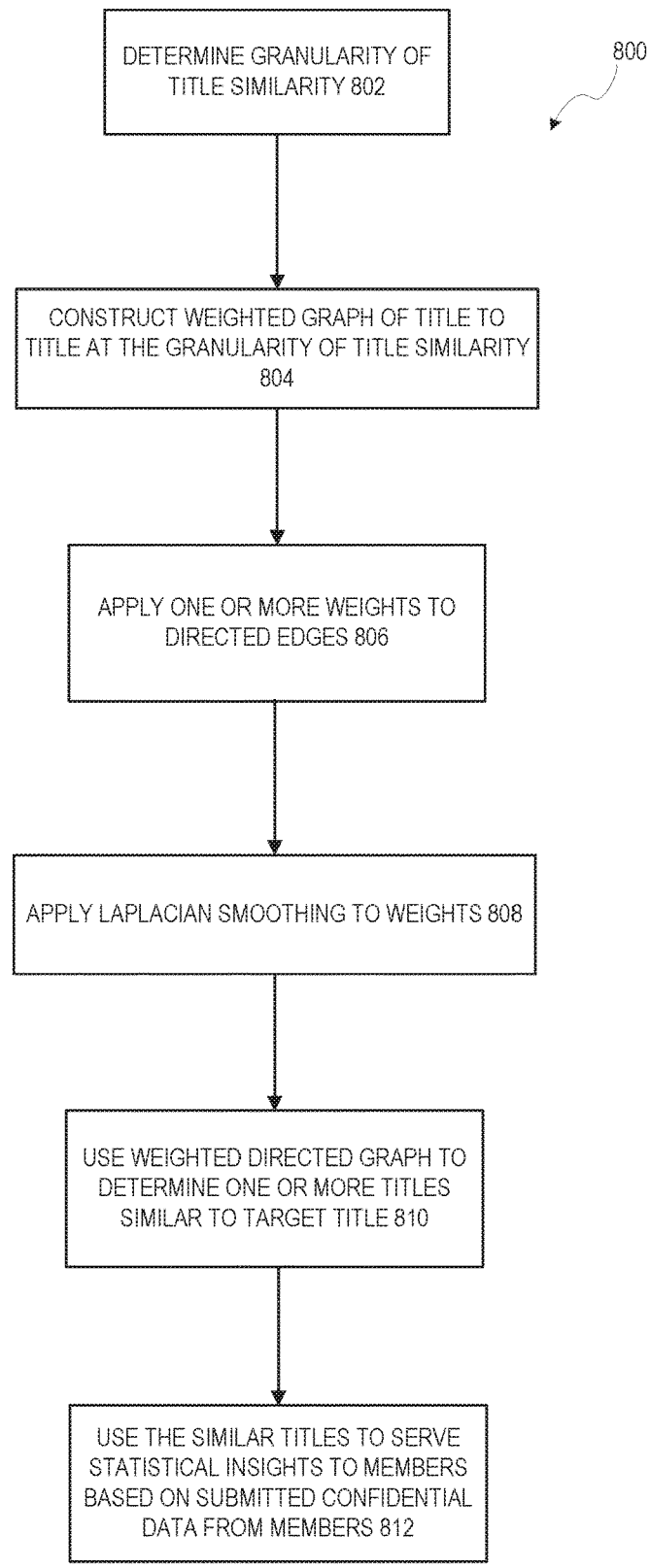
FIG. 8 is a flow diagram depicting a method for handling confidential data submitted by a user in a computer system, in accordance with an example embodiment.

FIG. 8 is a flow diagram illustrating a method 800 of determining similar titles to a title based on transition information in a social networking service, in accordance with an example embodiment. At operation 802, a granularity of title similarity may be determined. The granularity of title similarity may be a set of one or more filters to apply to social networking service data that results in only member data that satisfies the one or more filters being used. At operation 804, a weighted graph of titles at the granularity of title similarity is constructed, with each node in the graph being a title, and a directed edge occurring from a first node to a second node if a transition occurred in the member data from a title associated with the first node to a title associated with the second node at the granularity of title similarity. At operation 806, one or more weights may be applied to the directed edges. At operation 808, a Laplacian smoothing may be applied to the weights. At operation 810, the weighted directed graph is used to determine one or more titles similar to a target title by finding the node corresponding to the target title and following the edges for any edge having a weight greater than a threshold value to find a similar title at the other end of the edge. At operation 812, the similar titles are used to serve statistical insights to members based on submitted confidential data from the members.

In some example embodiments, a more complex traversal of the weighted directed graph may be utilized. For example, a personalized PageRank algorithm walk may be performed to capture subsequent transition information. For example, if users frequently transitioned from software engineer to senior software engineer and then subsequently transitioned to product manager, the personalized PageRank algorithm would capture this and indicate a similarity relationship between software engineer and product manager, despite few or no direct transitions from software engineer to product manager.

Additionally, in some example embodiments, graphs at different granularities may be combined. This may be helpful when data is sparse. For example, if the granularity of the graph is at the city level, the data may be quite sparse for many titles. A graceful fallback approach may be utilized, where the selected level of granularity is attempted and tested, and if data is deemed to be too sparse, a next higher level of granularity is attempted and tested, and so on and so forth until, if necessary, the highest level of granularity (global) is utilized. In a related alternative embodiment, if transitions for particular cities are not sparse, then the data for those cities may be maintained at the city level while other titles are generalized to the next higher level (e.g., state). In other words, the lowest level of granularity that produces results for individual entities may be selected on an entity-by-entity basis.

In another example embodiment, a weighted combination approach may be utilized, wherein graphs at different granularity levels are weighted differently and combined based on the weights.

In another example embodiment, similar titles are computed based on a combination of three approaches. The first approach is the above technique where a directed graph of title transitions is created and traversed. The second involves generating a skills-based title similarity graph where each title is represented as a weighted skill vector based on member profile data and job posting data. The edge weights in this skills-based title similarity graph indicate a similarity between corresponding vectors. This helps correct for issues where a job title itself might appear very similar to another due to transitions, but the underlying skills from the job titles are quite different. For example, it might just be that in a certain city there were a number of people who decided to give up software engineering positions to become artists. This graph would help identify that even though the number of transitions is significant, the skill sets are different enough that the titles should not be considered to be similar. This can be performed using, for example, cosine similarity or Jaccard similarity techniques. The third involves identifying titles that have been coselected by an advertiser to target an ad or ad campaign, and forming a graph based on this information (with nodes corresponding to titles and edges corresponding to advertisers co-selecting the titles). Thus, the similarity between a first title and a second title is the probability of being coselected compared to the probability of being individually selected. Finally, the outputs from these three graphs are combined. The three graphs utilize the same set of nodes, with different edges/edge weights. Combining the graphs then may involve combining all the edges onto a single graph. The edges for the different graphs could be weighted based on the graphs they came from, or simply averaged.

This combination could also be performed based on phases of a traversal operation. For example, one of the three graphs may be randomly selected at each stage of a multi-stage traversal.

Alternatively, the similar titles could be calculated for each graph separately and then the output similar titles could be combined.

Figure 9:
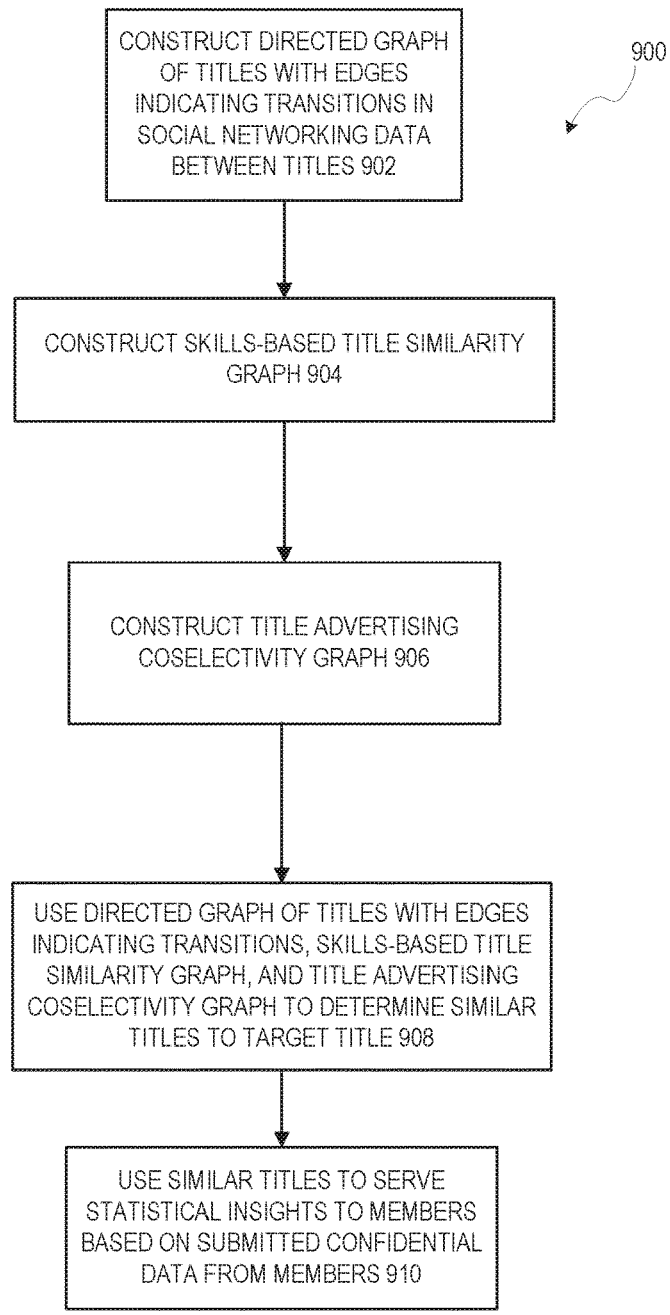
FIG. 9 is a flow diagram depicting a method for handling confidential data submitted by a user in a computer system, in accordance with another example embodiment.

FIG. 9 is a flow diagram illustrating a method 900 of determining similar titles to a title in a social networking service, in accordance with an example embodiment. At operation 902, a directed graph of titles with edges indicating transitions in social networking data between titles is constructed. This may be performed as described above with respect to operations 802-806 of FIG. 8 above. At operation 904, a skills-based title similarity graph is constructed where each node is a title having a weighted skill vector and the edges indicate a similarity between weighted skill vectors for corresponding nodes, based on member profile data and job posting data. At operation 906, a title advertising coselectivity graph is constructed where each node is a title and the edges are an indication that an advertiser coselected the corresponding titles.

At operation 908, the directed graph of titles with edges indicating transitions, the skills-based title similarity graph, and the title advertising coselectivity graph are used to determine similar titles to a target title. As described above, this may be performed in a number of different ways. Each of the graphs could be separately traversed using a traversal technique, producing separate outputs which could then be combined into a single output. Alternatively, the graphs themselves could be combined into a single graph, using either an average or weighted average for each graph, and that combined single graph traversed using a traversal technique.

At operation 910, the similar titles are used to serve statistical insights to members based on submitted confidential data from the members.

In some example embodiments, a more complex traversal of the weighted directed graph may be utilized. For example, a personalized PageRank algorithm walk may be performed to capture subsequent transition information. For example, if users frequently transitioned from software engineer to senior software engineer and then subsequently transitioned to product manager, the personalized PageRank algorithm would capture this and indicate a similarity relationship between software engineer and product manager, despite few or no direct transitions from software engineer to product manager.

Additionally, in some example embodiments, graphs at different granularities may be combined. This may be helpful when data is sparse. For example, if the granularity of the graph is at the city level, the data may be quite sparse for many titles. A graceful fallback approach may be utilized, where the selected level of granularity is attempted and tested, and if data is deemed to be too sparse, a next higher level of granularity is attempted and tested, and so on and so forth until, if necessary, the highest level of granularity (global) is utilized. In a related alternative embodiment, if transitions for particular cities are not sparse, then the data for those cities may be maintained at the city level while other titles are generalized to the next higher level (e.g., state). In other words, the lowest level of granularity that produces results for individual entities may be selected on an entity-by-entity basis.

In another example embodiment, a weighted combination approach may be utilized, wherein graphs at different granularity levels are weighted differently and combined based on the weights.

In another example embodiment, a directed graph on transition information is used to compute similar companies based on position transition data. Rather than a directed graph where the nodes correspond to location, here the nodes correspond to companies. The edges of the directed graph represent transitions from company to company. Weights may be based on one or more of a variety of different factors, such as the number of members that made this particular transition, the fraction of members who made this transition compared to all members who were at the first company (at the beginning of the edge), and a time-decay to give greater weight to more recent transitions. A Laplacian smoothing may then be introduced to address problems that might be caused by a small number of transitions. In an example embodiment, the Laplacian smoothing is dividing the numerator (number of transitions) by the denominator (number of members who held a position in the first company) plus some constant.

The graph itself can be constructed at a number of different levels, including global/industry/location/function/title granularity. The graph can then be used to obtain the most similar companies for a given company, as a function of the industry/job function/title/location, etc. In other words, the graph may be constructed at the level at which the similarity determination should be conducted.

Figure 10:
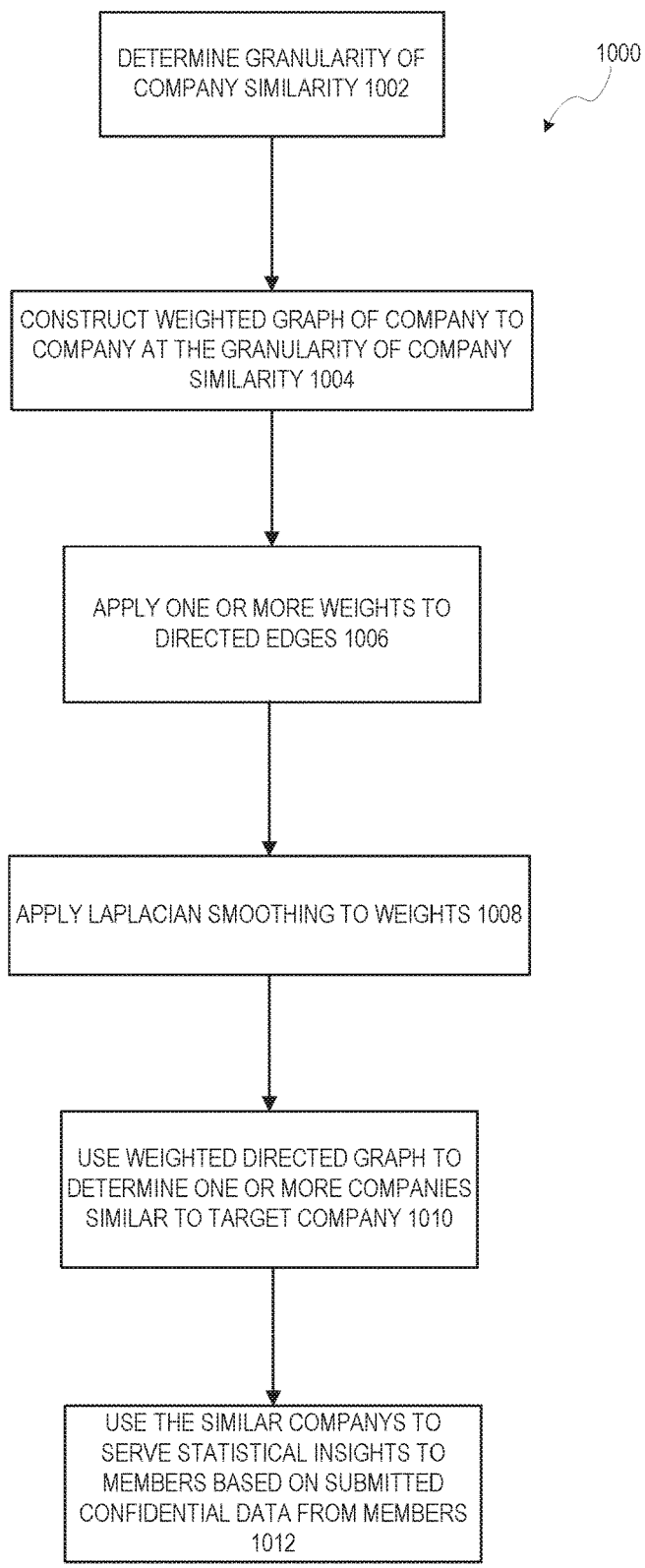
FIG. 10 is a flow diagram illustrating a method of determining similar companies to a target company based on transition information in a social networking service, in accordance with an example embodiment.

FIG. 10 is a flow diagram illustrating a method 1000 of determining similar companies to a target company based on transition information in a social networking service, in accordance with an example embodiment. At operation 1002, a granularity of company similarity may be determined. The granularity of company similarity may be a set of one or more filters to apply to social networking service data that results in only member data that satisfies the one or more filters being used. At operation 1004, a weighted graph of companies at the granularity of company similarity is constructed, with each node in the graph being a company, and a directed edge occurring from a first node to a second node if a transition occurred in the member data from a company associated with the first node to a company associated with the second node at the granularity of company similarity. At operation 1006, one or more weights may be applied to the directed edges. At operation 1008, a Laplacian smoothing may be applied to the weights. At operation 1010, the weighted directed graph is used to determine one or more companies similar to a target company by finding the node corresponding to the target company group and following the edges for any edge having a weight greater than a threshold value to find a similar company at the other end of the edge. At operation 1012, the similar companies are used to serve statistical insights to members based on submitted confidential data from the members.

In some example embodiments, a more complex traversal of the weighted directed graph may be utilized. For example, a personalized PageRank algorithm walk may be performed to capture subsequent transition information. For example, if users frequently transitioned from a software company group to a hardware company group and then subsequently transitioned to an information technology company group, the personalized PageRank algorithm would capture this and indicate a similarity relationship between the software and information technology company groups.

Additionally, in some example embodiments, graphs at different granularities may be combined. This may be helpful when data is sparse. For example, if the granularity of the graph is at the city level, the data may be quite sparse for many company groups. A graceful fallback approach may be utilized, where the selected level of granularity is attempted and tested, and if data is deemed to be too sparse, a next higher level of granularity is attempted and tested, and so on and so forth until, if necessary, the highest level of granularity (global) is utilized. In a related alternative embodiment if transitions for particular cities are not sparse then the data for those cities may be maintained at the city level while other titles are generalized to the next higher level (e.g., state). In other words, the lowest level of granularity that produces results for individual entities may be selected on an entity-by-entity basis.

In another example embodiment, a weighted combination approach may be utilized, wherein graphs at different granularity levels are weighted differently and combined based on the weights.

In another example embodiment, operation 912 may involve more complex analyses using the weighted graph. Specifically, similar companies can be grouped into three categories: (1) incoming companies; (2) outgoing companies; and (3) combined incoming and outgoing companies. An incoming company reflects a company from which member(s) transition to the target company. An outgoing company reflects a company from which member(s) transitioned from the target company. A combined incoming and outgoing company reflects a company that both was an incoming and outgoing company with respect to the target company. The underlying confidential data, such as compensation information, that is served to members may vary then depending upon which category of similar companies are most relevant. If a member is already working at a target company, the member likely will want to see compensation data for similar companies to which members working at the target company transitioned. Alternatively, if a member is not working at a target company and, perhaps, the insight is generated based on a search specifying the target company, the member will likely want to see information on similar companies from which members working at the target company transitioned from.

Alternatively, for compensation insights, companies in the incoming company category can be used as a lower bound for compensation insights whereas companies in the outgoing company category can be used as an upper bound for compensation insights.

Modules, Components, and Logic

Certain embodiments are described herein as including logic or a number of components, modules, or mechanisms. Modules may constitute either software modules (e.g., code embodied on a machine-readable medium) or hardware modules. A "hardware module" is a tangible unit capable of performing certain operations and may be configured or arranged in a certain physical manner. In various example embodiments, one or more computer systems (e.g., a standalone computer system, a client computer system, or a server computer system) or one or more hardware modules of a computer system (e.g., a processor or a group of processors) may be configured by software (e.g., an application or application portion) as a hardware module that operates to perform certain operations as described herein.

In some embodiments, a hardware module may be implemented mechanically, electronically, or any suitable combination thereof. For example, a hardware module may include dedicated circuitry or logic that is permanently configured to perform certain operations. For example, a hardware module may be a special-purpose processor, such as a Field-Programmable Gate Array (FPGA) or an Application Specific Integrated Circuit (ASIC). A hardware module may also include programmable logic or circuitry that is temporarily configured by software to perform certain operations. For example, a hardware module may include software executed by a general-purpose processor or other programmable processor. Once configured by such software, hardware modules become specific machines (or specific components of a machine) uniquely tailored to perform the configured functions and are no longer general-purpose processors. It will be appreciated that the decision to implement a hardware module mechanically, in dedicated and permanently configured circuitry, or in temporarily configured circuitry (e.g., configured by software) may be driven by cost and time considerations.

Accordingly, the phrase "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where a hardware module comprises a general-purpose processor configured by software to become a special-purpose processor, the general-purpose processor may be configured as respectively different special-purpose processors (e.g., comprising different hardware modules) at different times. Software accordingly configures a particular processor or processors, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple hardware modules exist contemporaneously, communications may be achieved through signal transmission (e.g., over appropriate circuits and buses) between or among two or more of the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions described herein. As used herein, "processor-implemented module" refers to a hardware module implemented using one or more processors.

Similarly, the methods described herein may be at least partially processor-implemented, with a particular processor or processors being an example of hardware. For example, at least some of the operations of a method may be performed by one or more processors or processor-implemented modules. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an API).

The performance of certain of the operations may be distributed among the processors, not only residing within a single machine, but deployed across a number of machines. In some example embodiments, the processors or processor-implemented modules may be located in a single geographic location (e.g., within a home environment, an office environment, or a server farm). In other example embodiments, the processors or processor-implemented modules may be distributed across a number of geographic locations.

Machine and Software Architecture

The modules, methods, applications, and so forth described in conjunction with FIGS. 1-10 are implemented in some embodiments in the context of a machine and an associated software architecture. The sections below describe representative software architecture(s) and machine (e.g., hardware) architecture(s) that are suitable for use with the disclosed embodiments.

Software architectures are used in conjunction with hardware architectures to create devices and machines tailored to particular purposes. For example, a particular hardware architecture coupled with a particular software architecture will create a mobile device, such as a mobile phone, tablet device, or so forth. A slightly different hardware and software architecture may yield a smart device for use in the "internet of things," while yet another combination produces a server computer for use within a cloud computing architecture. Not all combinations of such software and hardware architectures are presented here, as those of skill in the art can readily understand how to implement the inventive subject matter in different contexts from the disclosure contained herein.

Software Architecture

Figure 11:
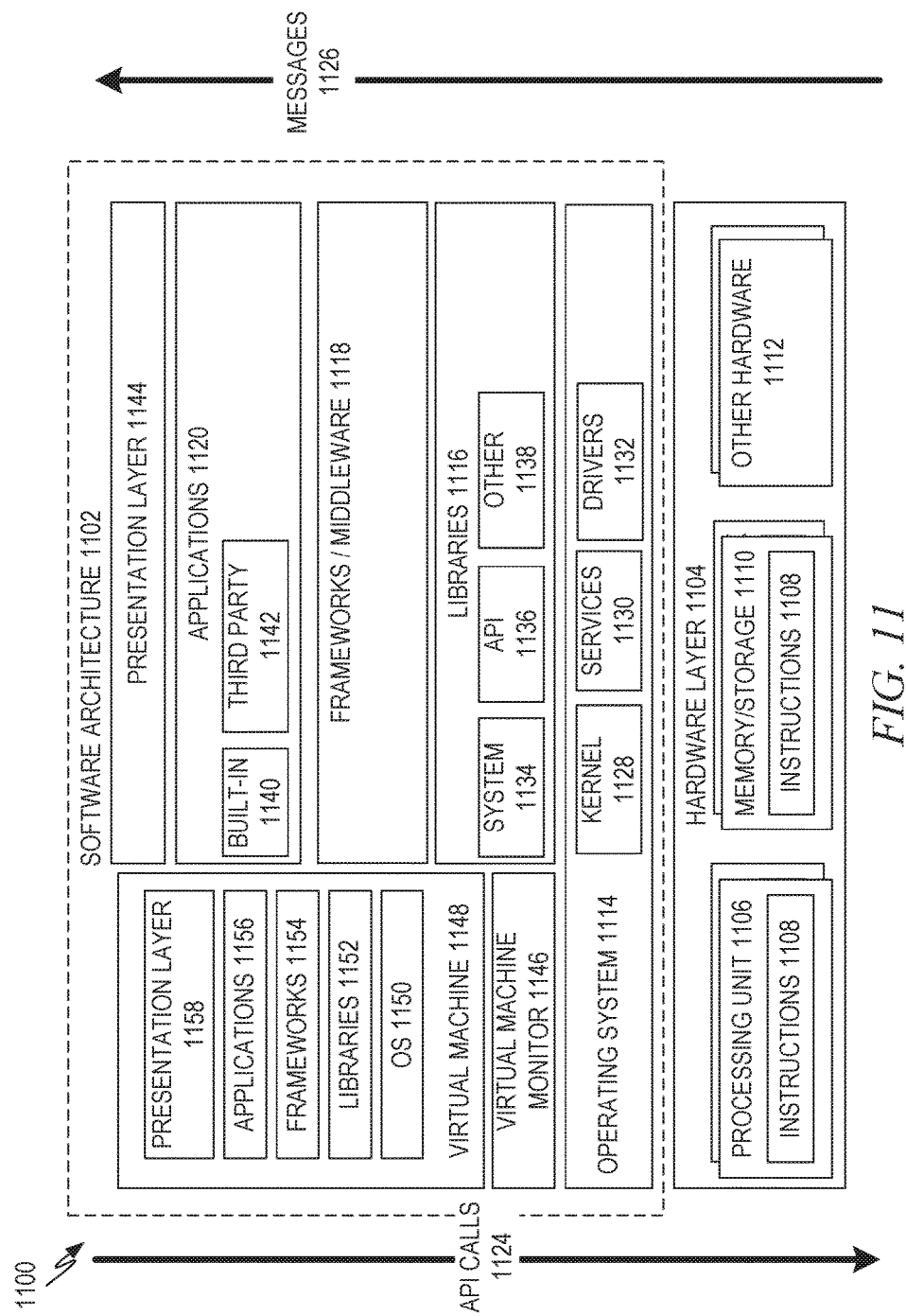
FIG. 11 is a block diagram illustrating a representative software architecture, which may be used in conjunction with various hardware architectures herein described.

FIG. 11 is a block diagram 1100 illustrating a representative software architecture 1102, which may be used in conjunction with various hardware architectures herein described. FIG. 11 is merely a non-limiting example of a software architecture, and it will be appreciated that many other architectures may be implemented to facilitate the functionality described herein. The software architecture 1102 may be executing on hardware such as a machine 1200 of FIG. 12 that includes, among other things, processors 1210, memory/storage 1230, and I/O components 1250. A representative hardware layer 1104 is illustrated and can represent, for example, the machine 1200 of FIG. 12. The representative hardware layer 1104 comprises one or more processing units 1106 having associated executable instructions 1108. The executable instructions 1108 represent the executable instructions of the software architecture 1102, including implementation of the methods, modules, and so forth of FIGS. 1-10. The hardware layer 1104 also includes memory and/or storage modules 1110, which also have the executable instructions 1108. The hardware layer 1104 may also comprise other hardware 1112, which represents any other hardware of the hardware layer 1104, such as the other hardware illustrated as part of the machine 1200.

In the example architecture of FIG. 11, the software architecture 1102 may be conceptualized as a stack of layers where each layer provides particular functionality. For example, the software architecture 1102 may include layers such as an operating system 1114, libraries 1116, frameworks/middleware 1118, applications 1120, and a presentation layer 1144. Operationally, the applications 1120 and/or other components within the layers may invoke API calls 1124 through the software stack and receive responses, returned values, and so forth, illustrated as messages 1126, in response to the API calls 1124. The layers illustrated are representative in nature and not all software architectures have all layers. For example, some mobile or special-purpose operating systems may not provide a layer of frameworks/middleware 1118, while others may provide such a layer. Other software architectures may include additional or different layers.

The operating system 1114 may manage hardware resources and provide common services. The operating system 1114 may include, for example, a kernel 1128, services 1130, and drivers 1132. The kernel 1128 may act as an abstraction layer between the hardware and the other software layers. For example, the kernel 1128 may be responsible for memory management, processor management (e.g., scheduling), component management, networking, security settings, and so on. The services 1130 may provide other common services for the other software layers. The drivers 1132 may be responsible for controlling or interfacing with the underlying hardware. For instance, the drivers 1132 may include display drivers, camera drivers, Bluetooth® drivers, flash memory drivers, serial communication drivers (e.g., Universal Serial Bus (USB) drivers), Wi-Fi® drivers, audio drivers, power management drivers, and so forth depending on the hardware configuration.

The libraries 1116 may provide a common infrastructure that may be utilized by the applications 1120 and/or other components and/or layers. The libraries 1116 typically provide functionality that allows other software modules to perform tasks in an easier fashion than by interfacing directly with the underlying operating system 1114 functionality (e.g., kernel 1128, services 1130, and/or drivers 1132). The libraries 1116 may include system libraries 1134 (e.g., C standard library) that may provide functions such as memory allocation functions, string manipulation functions, mathematical functions, and the like. In addition, the libraries 1116 may include API libraries 1136 such as media libraries (e.g., libraries to support presentation and manipulation of various media formats such as MPEG4, H.264, MP3, AAC, AMR, JPG, PNG), graphics libraries (e.g., an OpenGL framework that may be used to render 2D and 3D graphic content on a display), database libraries (e.g., SQLite that may provide various relational database functions), web libraries (e.g., WebKit that may provide web browsing functionality), and the like. The libraries 1116 may also include a wide variety of other libraries 1138 to provide many other APIs to the applications 1120 and other software components/modules.

The frameworks 1118 (also sometimes referred to as middleware) may provide a higher-level common infrastructure that may be utilized by the applications 1120 and/or other software components/modules. For example, the frameworks 1118 may provide various graphic user interface (GUI) functions, high-level resource management, high-level location services, and so forth. The frameworks 1118 may provide a broad spectrum of other APIs that may be utilized by the applications 1120 and/or other software components/modules, some of which may be specific to a particular operating system or platform.

The applications 1120 include built-in applications 1140 and/or third-party applications 1142. Examples of representative built-in applications 1140 may include, but are not limited to, a contacts application, a browser application, a book reader application, a location application, a media application, a messaging application, and/or a game application. The third-party applications 1142 may include any of the built-in applications 1140 as well as a broad assortment of other applications. In a specific example, the third-party application 1142 (e.g., an application developed using the Android™ or iOS™ software development kit (SDK) by an entity other than the vendor of the particular platform) may be mobile software running on a mobile operating system such as iOS™, Android™, Windows® Phone, or other mobile operating systems. In this example, the third-party application 1142 may invoke the API calls 1124 provided by the mobile operating system such as the operating system 1114 to facilitate functionality described herein.

The applications 1120 may utilize built-in operating system 1114 functions (e.g., kernel 1128, services 1130, and/or drivers 1132), libraries 1116 (e.g., system libraries 1134, API libraries 1136, and other libraries 1138), and frameworks/middleware 1118 to create user interfaces to interact with users of the system. Alternatively, or additionally, in some systems, interactions with a user may occur through a presentation layer, such as the presentation layer 1144. In these systems, the application/module "logic" can be separated from the aspects of the application/module that interact with a user.

Some software architectures utilize virtual machines. In the example of FIG. 11, this is illustrated by a virtual machine 1148. A virtual machine creates a software environment where applications/modules can execute as if they were executing on a hardware machine (such as the machine 1200 of FIG. 12, for example). A virtual machine is hosted by a host operating system (e.g., operating system 1114 in FIG. 11) and typically, although not always, has a virtual machine monitor 1146, which manages the operation of the virtual machine 1148 as well as the interface with the host operating system (e.g., operating system 1114). A software architecture executes within the virtual machine 1148, such as an operating system 1150, libraries 1152, frameworks/middleware 1154, applications 1156, and/or a presentation layer 1158. These layers of software architecture executing within the virtual machine 1148 can be the same as corresponding layers previously described or may be different.

Example Machine Architecture and Machine-Readable Medium

Figure 12:
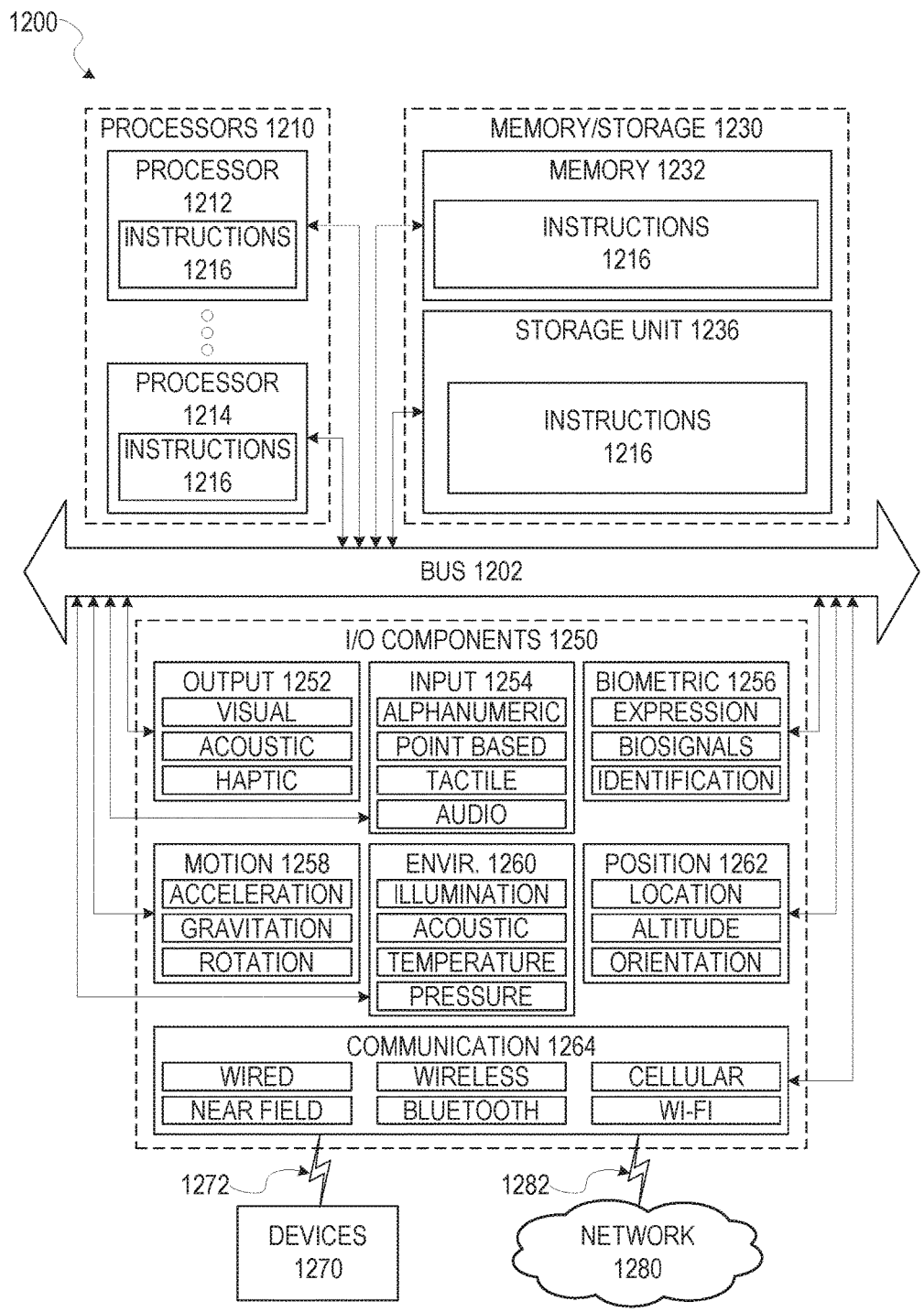
FIG. 12 is a block diagram illustrating components of a machine, according to some example embodiments, able to read instructions from a machine-readable medium (e.g., a machine-readable storage medium) and perform any one or more of the methodologies discussed herein.

FIG. 12 is a block diagram illustrating components of a machine 1200, according to some example embodiments, able to read instructions from a machine-readable medium (e.g., a machine-readable storage medium) and perform any one or more of the methodologies discussed herein. Specifically, FIG. 12 shows a diagrammatic representation of the machine 1200 in the example form of a computer system, within which instructions 1216 (e.g., software, a program, an application, an applet, an app, or other executable code) for causing the machine 1200 to perform any one or more of the methodologies discussed herein may be executed. The instructions 1216 transform the general, non-programmed machine 1200 into a particular machine 1200 programmed to carry out the described and illustrated functions in the manner described. In alternative embodiments, the machine 1200 operates as a standalone device or may be coupled (e.g., networked) to other machines. In a networked deployment, the machine 1200 may operate in the capacity of a server machine or a client machine in a server-client network environment, or as a peer machine in a peer-to-peer (or distributed) network environment. The machine 1200 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 1216, sequentially or otherwise, that specify actions to be taken by the machine 1200. Further, while only a single machine 1200 is illustrated, the term "machine" shall also be taken to include a collection of machines 1200 that individually or jointly execute the instructions 1216 to perform any one or more of the methodologies discussed herein.

The machine 1200 may include processors 1210, memory/storage 1230, and I/O components 1250, which may be configured to communicate with each other such as via a bus 1202. In an example embodiment, the processors 1210 (e.g., a Central Processing Unit (CPU), a Reduced Instruction Set Computing (RISC) processor, a Complex Instruction Set Computing (CISC) processor, a Graphics Processing Unit (GPU), a Digital Signal Processor (DSP), an ASIC, a Radio-Frequency Integrated Circuit (RFIC), another processor, or any suitable combination thereof) may include, for example, a processor 1212 and a processor 1214 that may execute the instructions 1216. The term "processor" is intended to include multi-core processors that may comprise two or more independent processors (sometimes referred to as "cores") that may execute the instructions 1216 contemporaneously. Although FIG. 12 shows multiple processors 1210, the machine 1200 may include a single processor with a single core, a single processor with multiple cores (e.g., a multi-core processor), multiple processors with a single core, multiple processors with multiples cores, or any combination thereof.

The memory/storage 1230 may include a memory 1232, such as a main memory, or other memory storage, and a storage unit 1236, both accessible to the processors 1210 such as via the bus 1202. The storage unit 1236 and memory 1232 store the instructions 1216 embodying any one or more of the methodologies or functions described herein. The instructions 1216 may also reside, completely or partially, within the memory 1232, within the storage unit 1236, within at least one of the processors 1210 (e.g., within the processor's cache memory), or any suitable combination thereof, during execution thereof by the machine 1200. Accordingly, the memory 1232, the storage unit 1236, and the memory of the processors 1210 are examples of machine-readable media.

As used herein, "machine-readable medium" means a device able to store instructions and data temporarily or permanently and may include, but is not limited to, random-access memory (RAM), read-only memory (ROM), buffer memory, flash memory, optical media, magnetic media, cache memory, other types of storage (e.g., Erasable Programmable Read-Only Memory (EEPROM)), and/or any suitable combination thereof. The term "machine-readable medium" should be taken to include a single medium or multiple media (e.g., a centralized or distributed database, or associated caches and servers) able to store the instructions 1216. The term "machine-readable medium" shall also be taken to include any medium, or combination of multiple media, that is capable of storing instructions (e.g., instructions 1216) for execution by a machine (e.g., machine 1200), such that the instructions, when executed by one or more processors of the machine (e.g., processors 1210), cause the machine to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" excludes signals per se.

The I/O components 1250 may include a wide variety of components to receive input, provide output, produce output, transmit information, exchange information, capture measurements, and so on. The specific I/O components 1250 that are included in a particular machine will depend on the type of machine. For example, portable machines such as mobile phones will likely include a touch input device or other such input mechanisms, while a headless server machine will likely not include such a touch input device. It will be appreciated that the I/O components 1250 may include many other components that are not shown in FIG. 12. The I/O components 1250 are grouped according to functionality merely for simplifying the following discussion and the grouping is in no way limiting. In various example embodiments, the I/O components 1250 may include output components 1252 and input components 1254. The output components 1252 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 1254 may include alphanumeric input components (e.g., a keyboard, a touch screen configured to receive alphanumeric input, a photo-optical keyboard, or other alphanumeric input components), point based input components (e.g., a mouse, a touchpad, a trackball, a joystick, a motion sensor, or another pointing instrument), tactile input components (e.g., a physical button, a touch screen that provides location and/or force of touches or touch gestures, or other tactile input components), audio input components (e.g., a microphone), and the like.

In further example embodiments, the I/O components 1250 may include biometric components 1256, motion components 1258, environmental components 1260, or position components 1262, among a wide array of other components. For example, the biometric components 1256 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram based identification), and the like. The motion components 1258 may include acceleration sensor components (e.g., accelerometer), gravitation sensor components, rotation sensor components (e.g., gyroscope), and so forth. The environmental components 1260 may include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detect concentrations of hazardous gases for safety or to measure pollutants in the atmosphere), or other components that may provide indications, measurements, or signals corresponding to a surrounding physical environment. The position components 1262 may include location sensor components (e.g., a Global Position System (GPS) receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 1250 may include communication components 1264 operable to couple the machine 1200 to a network 1280 or devices 1270 via a coupling 1282 and a coupling 1272, respectively. For example, the communication components 1264 may include a network interface component or other suitable device to interface with the network 1280. In further examples, the communication components 1264 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 1270 may be another machine or any of a wide variety of peripheral devices (e.g., a peripheral device coupled via a USB).

Moreover, the communication components 1264 may detect identifiers or include components operable to detect identifiers. For example, the communication components 1264 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 1264, such as location via Internet Protocol (IP) geolocation, location via Wi-Fi® signal triangulation, location via detecting an NFC beacon signal that may indicate a particular location, and so forth.
Transmission Medium In various example embodiments, one or more portions of the network 1280 may be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, the network 1280 or a portion of the network 1280 may include a wireless or cellular network and the coupling 1282 may be a Code Division Multiple Access (CDMA) connection, a Global System for Mobile communications (GSM) connection, or another type of cellular or wireless coupling. In this example, the coupling 1282 may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard-setting organizations, other long range protocols, or other data transfer technology.

The instructions 1216 may be transmitted or received over the network 1280 using a transmission medium via a network interface device (e.g., a network interface component included in the communication components 1264) and utilizing any one of a number of well-known transfer protocols (e.g., Hypertext Transfer Protocol (HTTP)). Similarly, the instructions 1216 may be transmitted or received using a transmission medium via the coupling 1272 (e.g., a peer-to-peer coupling) to the devices 1270. The term "transmission medium" shall be taken to include any intangible medium that is capable of storing, encoding, or carrying the instructions 1216 for execution by the machine 1200, and includes digital or analog communications signals or other intangible media to facilitate communication of such software.
Language Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Although an overview of the inventive subject matter has been described with reference to specific example embodiments, various modifications and changes may be made to these embodiments without departing from the broader scope of embodiments of the present disclosure. Such embodiments of the inventive subject matter may be referred to herein, individually or collectively, by the term "invention" merely for convenience and without intending to voluntarily limit the scope of this application to any single disclosure or inventive concept if more than one is, in fact, disclosed.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

As used herein, the term "or" may be construed in either an inclusive or exclusive sense. Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

What is claimed is:

1. A system comprising:
 a non-transitory computer-readable medium having instructions stored thereon, which, when executed by a processor, cause the system to:
  determine a granularity of location similarity, wherein the granularity of location similarity is a level at which social networking data should be filtered to identify locations similar to a target location;
  construct a weighted graph of locations at the granularity of location similarity, wherein each node in the weighted graph is a location and a directed edge exists in the weighted graph between a first node and a second node if the social networking data, at the granularity of location similarity, indicates that a transition occurred wherein a member who resided at a location corresponding to the first node transitioned to reside to a location corresponding to the second node, wherein each directed edge contains a weight indicating a strength of relationship between nodes;
  traverse the weighted graph of locations from a node corresponding to the target location in order to identify locations similar to the target location, wherein the traversing including finding a node corresponding to the target location and following edges for any edge having a weight greater than a threshold value to find a similar location at another end of the followed edge;

retrieve, from an external data source, one or more confidential data values having been entered on screens of a first set of one or more graphical user interfaces and encrypted on the external data source, the one or more confidential data values having attributes matching the identified locations similar to the target location; and present information corresponding to the retrieved one or more confidential data values in a second set of one or more graphical user interfaces.

2. The system of claim 1, wherein the weight for each edge in the weighted graph is based on a number of members who transitioned between a first location corresponding to a node at the beginning of the edge to a second location corresponding to a node at the end of the edge.

3. The system of claim 1, wherein the weight for each edge in the weighted graph is based on a number of members who transitioned between a first location corresponding to a node at the beginning of the edge to a second location corresponding to a node at the end of the edge divided by a total number of members who resided at the first location.

4. The system of claim 1, wherein the instructions further cause the system to perform a Laplacian smoothing to the weights of the edges.

5. The system of claim 1, wherein the weight for each edge in the weighted graph is based at least in part on recentness of transitions between locations.

6. The system of claim 1, wherein the traversing includes performing a graceful fallback traversal wherein the granularity of location similarity is gradually stepped up level by level if a particular granularity results in too sparse social networking data.

7. A method comprising:
determining a granularity of location similarity, wherein the granularity of location similarity is a level at which social networking data should be filtered to identify locations similar to a target location;

constructing a weighted graph of locations at the granularity of location similarity, wherein each node in the weighted graph is a location and a directed edge exists in the weighted graph between a first node and a second node if the social networking data, at the granularity of location similarity, indicates that a transition occurred wherein a member who resided at a location corresponding to the first node transitioned to reside to a location corresponding to the second node, wherein each directed edge contains a weight indicating a strength of relationship between nodes;

traversing the weighted graph of locations from a node corresponding to the target location in order to identify locations similar to the target location, wherein the traversing including finding a node corresponding to the target location and following edges for any edge having a weight greater than a threshold value to find a similar location at another end of the followed edge;

retrieving, from an external data source, one or more confidential data values having been entered on screens of a first set of one or more graphical user interfaces and encrypted on the external data source, the one or more confidential data values having attributes matching the identified locations similar to the target location; and presenting information corresponding to the retrieved one or more confidential data values in a second set of one or more graphical user interfaces.

8. The method of claim 7, wherein the weight for each edge in the weighted graph is based on a number of members who transitioned between a first location corresponding to a node at the beginning of the edge to a second location corresponding to a node at the end of the edge.

9. The method of claim 7, wherein the weight for each edge in the weighted graph is based on a number of members who transitioned between a first location corresponding to a node at the beginning of the edge to a second location corresponding to a node at the end of the edge divided by a total number of members who resided at the first location.

10. The method of claim 7, further comprising performing a Laplacian smoothing to the weights of the edges.

11. The method of claim 7, wherein the weight for each edge in the weighted graph is based at least in part on recentness of transitions between locations.

12. The method of claim 7, wherein the traversing includes performing a graceful fallback traversal wherein the granularity of location similarity is gradually stepped up level by level if a particular granularity results in too sparse social networking data.

13. A non-transitory machine-readable storage medium comprising instructions, which when implemented by one or more machines, cause the one or more machines to perform operations comprising:
determining a granularity of location similarity, wherein the granularity of location similarity is a level at which social networking data should be filtered to identify locations similar to a target location;

constructing a weighted graph of locations at the granularity of location similarity, wherein each node in the weighted graph is a location and a directed edge exists in the weighted graph between a first node and a second node if the social networking data, at the granularity of location similarity, indicates that a transition occurred wherein a member who resided at a location corresponding to the first node transitioned to reside to a location corresponding to the second node, wherein each directed edge contains a weight indicating a strength of relationship between nodes;

traversing the weighted graph of locations from a node corresponding to the target location in order to identify locations similar to the target location, wherein the traversing including finding a node corresponding to the target location and following edges for any edge having a weight greater than a threshold value to find a similar location at another end of the followed edge;

retrieving, from an external data source, one or more confidential data values having been entered on screens of a first set of one or more graphical user interfaces and encrypted on the external data source, the one or more confidential data values having attributes matching the identified locations similar to the target location; and presenting information corresponding to the retrieved one or more confidential data values in a second set of one or more graphical user interfaces.

14. The non-transitory machine-readable storage medium of claim 13, wherein the weight for each edge in the weighted graph is based on a number of members who transitioned between a first location corresponding to a node at the beginning of the edge to a second location corresponding to a node at the end of the edge.

15. The non-transitory machine-readable storage medium of claim 13, wherein the weight for each edge in the weighted graph is based on a number of members who transitioned between a first location corresponding to a node at the beginning of the edge to a second location corresponding to a node at the end of the edge divided by a total number of members who resided at the first location.

16. The non-transitory machine-readable storage medium of claim 13, wherein the instructions further cause the one or more machines to perform a Laplacian smoothing to the weights of the edges.

17. The non-transitory machine-readable storage medium of claim 13, wherein the weight for each edge in the weighted graph is based at least in part on recentness of transitions between locations.

18. The non-transitory machine-readable storage medium of claim 13, wherein the traversing includes performing a graceful fallback traversal wherein the granularity of location similarity is gradually stepped up level by level if a particular granularity results in too sparse social networking data.

* * * * *